US012768280B2

(12) United States Patent
Alecu

(10) Patent No.: US 12,768,280 B2
(45) Date of Patent: Oct. 20, 2026

(54) SEAL ASSEMBLY AND METHOD OF MANUFACTURING

(71) Applicant: PRATT & WHITNEY CANADA CORP., Longueuil (CA)

(72) Inventor: Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/055,858

(22) Filed: Feb. 18, 2025

(65) Prior Publication Data

US 2025/0215804 A1 Jul. 3, 2025

Related U.S. Application Data

(62) Division of application No. 18/325,050, filed on May 29, 2023, now Pat. No. 12,258,866.

(51) Int. Cl.

| | |
|---|---|
| ***F16J 15/3288*** | (2016.01) |
| ***B21D 11/10*** | (2006.01) |
| ***B21D 13/02*** | (2006.01) |
| ***B21F 1/00*** | (2006.01) |
| ***B21F 1/04*** | (2006.01) |
| ***F01D 11/00*** | (2006.01) |
| ***F16J 15/328*** | (2016.01) |
| ***F16J 15/3292*** | (2016.01) |

(52) U.S. Cl.

CPC ............ *F01D 11/003* (2013.01); *B21D 11/10* (2013.01); *B21D 13/02* (2013.01); *B21F 1/004* (2013.01); *B21F 1/04* (2013.01); *F16J 15/328* (2013.01); *F16J 15/3288* (2013.01); *F16J 15/3292* (2013.01); *F05D 2240/56* (2013.01)

(58) Field of Classification Search

CPC ........ B21D 13/02; B21D 11/07; B21D 11/10; B21F 1/004; B21F 1/04; B21F 45/00; F16J 15/328; F16J 15/3288; F16J 15/3292; F01D 11/001–003; F05D 2240/55–57; F05D 2240/59

See application file for complete search history.

(56) References Cited

U.S. PATENT DOCUMENTS

| | | | | |
|---|---|---|---|---|
| 3,641,803 A * | 2/1972 | Schuurbiers | H01H 11/04 72/190 |
| 3,869,926 A * | 3/1975 | Keller | B21F 1/04 74/25 |
| 4,678,113 A | 7/1987 | Bridges et al. | |
| 5,556,172 A | 9/1996 | Howe | |

(Continued)

FOREIGN PATENT DOCUMENTS

| | | | |
|---|---|---|---|
| GB | 2026627 A | 2/1980 | |
| KR | 102039978 B1 * | 11/2019 | B21D 5/0281 |

*Primary Examiner* — Matthew P Travers

(74) *Attorney, Agent, or Firm* — Norton rose fulbright Canada LLP

(57) ABSTRACT

The seal assembly can have a support ring having an annular shape defined around a seal axis, and a plurality of strips of a metal material, each strip of the plurality of strips being folded along a length of the strip forming a fold and a pair of segments extending radially inwardly from the fold, relative the seal axis, the fold secured at the support ring, the fold having a bending radius defined around a bending axis, the bending axis oriented parallel to the seal axis, the plurality of strips being arranged circumferentially relative one another, around the seal axis.

11 Claims, 6 Drawing Sheets

(56) References Cited

U.S. PATENT DOCUMENTS

| | | | | |
|---|---|---|---|---|
| 6,109,616 | A | 8/2000 | Mayr | |
| 8,752,288 | B2 | 6/2014 | Williams et al. | |
| 8,844,131 | B2 | 9/2014 | Franceschini | |
| 9,598,970 | B2 | 3/2017 | Inoue | |
| 2002/0014009 | A1 * | 2/2002 | Hobbs | B21F 1/04 29/412 |
| 2003/0071423 | A1 * | 4/2003 | Urlichs | F16J 15/3292 277/411 |
| 2007/0126187 | A1 * | 6/2007 | McMillan | F16J 15/445 277/409 |
| 2008/0099999 | A1 | 5/2008 | Williams | |
| 2008/0224415 | A1 | 9/2008 | Flaherty et al. | |
| 2011/0156361 | A1 | 6/2011 | Ghalambor et al. | |
| 2011/0182721 | A1 | 7/2011 | Saunders | |
| 2013/0033008 | A1 | 2/2013 | Martin et al. | |

* cited by examiner

SEAL ASSEMBLY AND METHOD OF MANUFACTURING

TECHNICAL FIELD

The application relates generally to seals and, more particularly, to seals suitable for use in gas turbine engines.

BACKGROUND OF THE ART

Seals are used in many turbine applications to impede axial fluid leakage between a stator and a rotor, or between concentric rotors for instance. Several types of seals exist such as carbon seals, labyrinth seals, and brush seals. Brush seals may provide significant benefits to modern gas turbine engines, such as high temperature working environment, low leakage rate, limited axial length and good durability. However, brush seals can be more expensive than some other types of seals. There thus remained room for improvement such as in terms of reducing the costs of brush seals.

SUMMARY

In one aspect, there is provided a seal assembly comprising: a support ring extending annularly around a seal axis; and a seal extending annularly around the seal axis, the seal having a succession of lobes of a flat metal material circumferentially distributed around the seal axis, each lobe of the succession of lobes having a pair of segments extending radially inwardly from a fold, relative the seal axis, the fold secured at the support ring, the fold having a bending radius defined around a bending axis, the bending axis oriented parallel to the seal axis.

In another aspect, there is provided a process of making a seal assembly, the process comprising: folding a strip of metal material into an alternating sequence of internal folds and external folds; and securing the strip of metal material to a support ring having an annular shape defined around a seal axis, including securing the external folds to the support ring in a manner for the strip to be arranged circumferentially relative the axis with the internal folds located radially inwardly relative corresponding ones of the external folds.

In a further aspect, there is provided a seal comprising: a strip of metal material, the strip being elongated and flat, the strip having a first face opposite a second face, the strip being regularly folded, alternatingly onto the first face and onto the second face, forming a plurality of first folds and a plurality of second folds, respectively, the strip being arranged in an annular shape around an axis, with the first folds adjacent one another at a radially-external region of the annular shape, the second folds adjacent one another at a radially-internal region of the annular shape and a plurality of straight segments connecting corresponding ones of the first folds to corresponding ones of the second folds; and a support ring having an annular shape defined around the axis, the support ring receiving the first folds.

DESCRIPTION OF THE DRAWINGS

Reference is now made to the accompanying figures in which.

DETAILED DESCRIPTION

Figure 1:
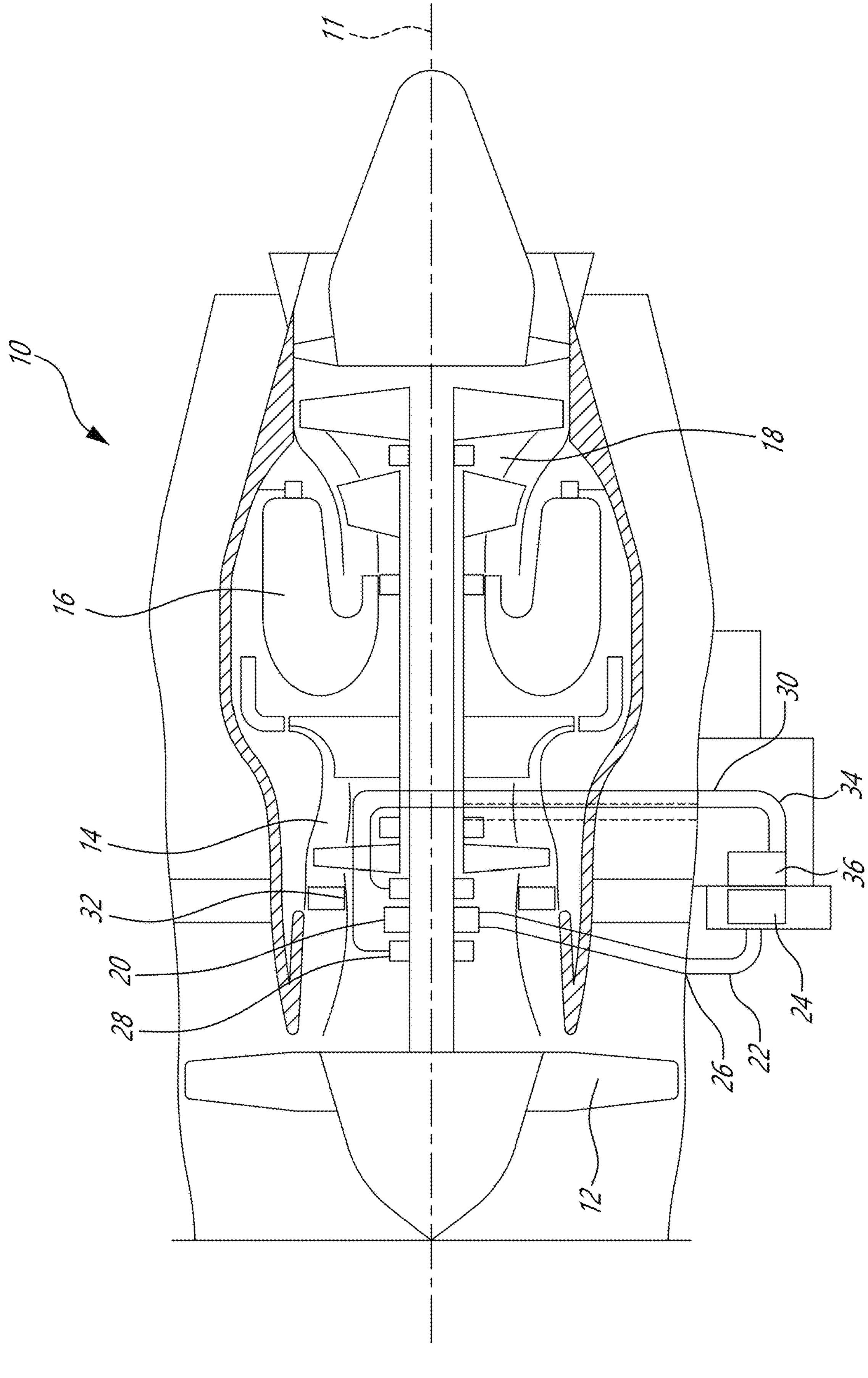
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases.

The compressor 14, fan 12 and turbine 18 have rotating components which can be mounted on one or more shafts. Bearings 20 are used to provide smooth relative rotation between a shaft and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to contain the oil. A scavenge system 30 having cavities 32, conduits 34, and one or more scavenge pumps 36, is used to recover the oil, which can be in the form of an oil foam at that stage, from the bearings 20. The oil pump 24 typically draws the oil from an oil reservoir 38, and it is relatively common to use some form of air/oil separating device in the return line. Seals may also be used for various uses and in other types of gas turbine engines, such as on a propeller shaft or a power shaft of a propeller airplane or helicopter to name some potential examples.

Figure 2:
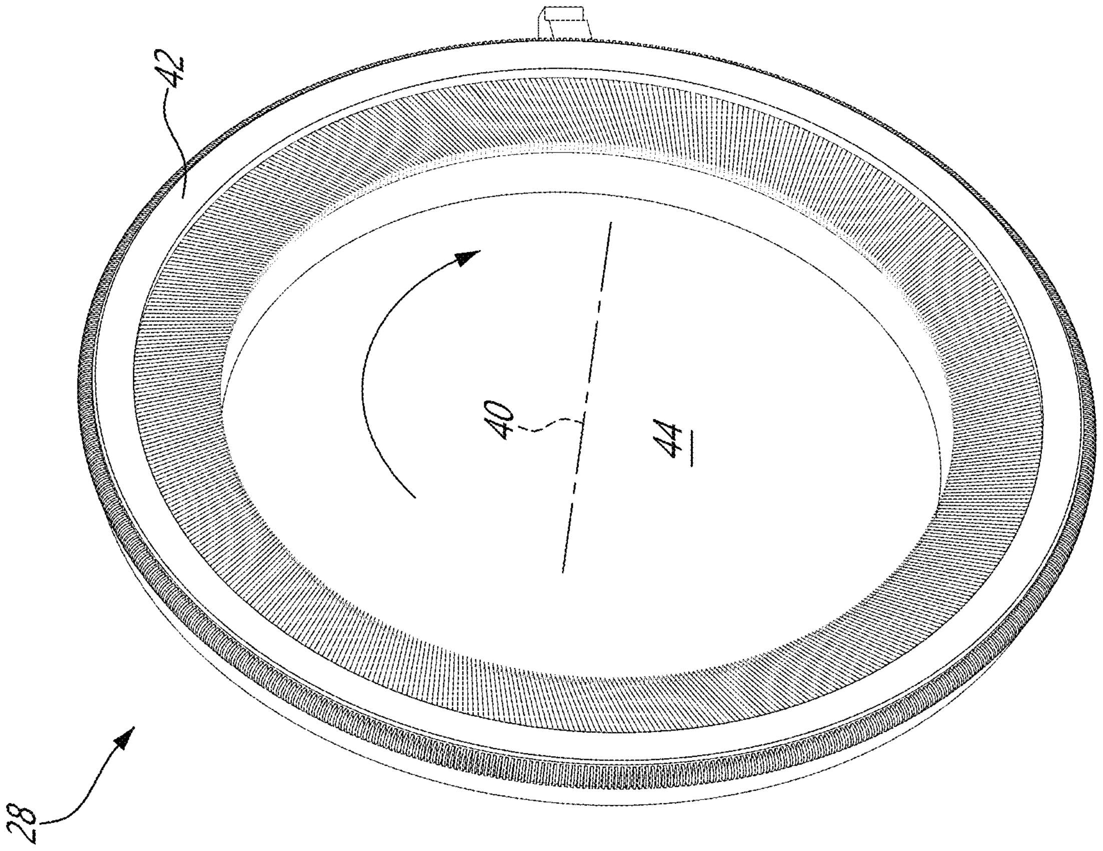
FIG. 2 is an oblique view showing an example of a brush seal.

FIG. 2 presents an example of a seal assembly 28. In this example, the seal assembly 28 is a brush seal. The seal assembly 28 generally has an annular geometry defined around an axis which will be referred to as the seal axis 40. The seal axis 40 can coincide with a main axis 11 of a gas turbine engine 10 for instance. The seal 28 has a support ring 42 which extends annularly around the seal axis 40. The seal 28 has a plurality of bristles of a metal material. The bristles each have two opposite ends which will be referred to as the first ends and the second ends. The first ends are secured to the support ring 42, whereas the second ends are free. A circular opening 44 concentric to the seal axis 40 is delimited by the second ends of the bristles. The bristles extend radially inwardly from the first ends, and support ring 42, to the second ends. In this embodiment, the bristles extend obliquely, i.e. not only radially but also tangentially, and the second ends can thus be circumferentially offset from corresponding ones of the first ends. Alternately, the bristles may extend purely radially, in which case the second ends will not be offset from the first ends. The first ends can be held by the support ring 42 in any suitable way. A typical way of holding the first ends at the support ring is by welding the first ends between two annular rails, which can leave a radially-external welding seam 50, with bristles trapped between a front wall 46 axially opposite a rear wall 48, as best seen in FIG. 3.

Figure 3:
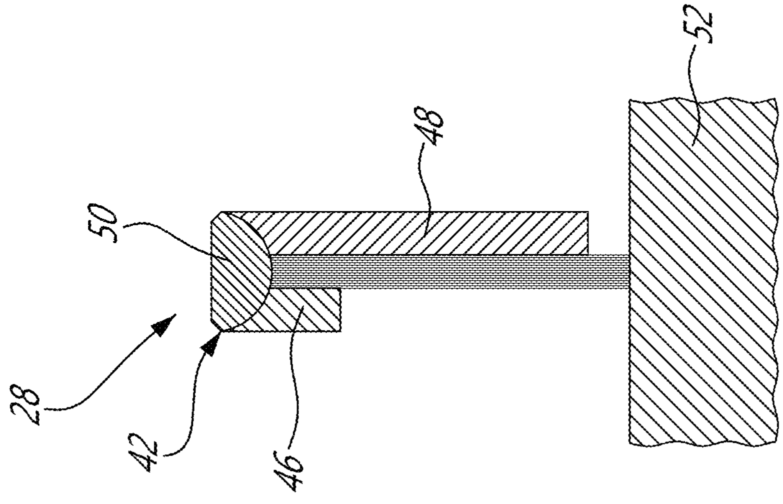
FIG. 3 is a cross-sectional view taken in an axial plane, showing an example of a brush seal engaged with a rotor.

FIG. 3 shows a portion of a cross-sectional view, enlarged, showing a relationship between the seal assembly 28 and a rotor 52 during use. The rotor 52 can be engaged in the circular opening 44. The seal assembly 28 can be assembled to a stator or another rotor via the support ring 42, and the bristles can extend towards, and engage an external surface of, the rotor 52. The second ends of the bristles may remain in contact with the external surface of the rotor 52 during use, when there is relative rotary movement, around the seal axis 40, between the rotor 52 and the support ring 42. The tangential portion of the oblique orientation of the bristles can be selected in a manner to be in the same direction as the direction of rotation of the rotor, in a manner that the second ends of the bristles may trail along the external surface of the rotor 52, with the rotor gently pulling the bristles along their length, rather than engage the rotor 52 in a way which would tend to compress or bend the bristles. In other words, the relative direction of rotation of the rotor 52 may be as shown with the arrow in FIG. 2, when the seal assembly does not rotate.

A first example process of manufacturing such a seal assembly 28 will now be described. The first example process can include, in sequence, the following steps. To begin, an elongated strand of wire is produced. This elongated strand is cut into a plurality of shorter strands all having a characteristic length. The characteristic length can depend on the diameter of the seal for instance (which can depend on a diameter of the rotor 52), or on other parameters associated to the seal's design. The shorter strands are assembled into groups of parallel strands referred to herein as tufts. The tufts can then be stabilized by gluing or welding at one end, corresponding to a first end of the strands composing it, and the other end can remain free. The tufts may then be laid into a fixture and arranged in a desired configuration. At this point, the first ends of the tufts may be cut in order to more closely match the desired configuration. The tufts may then be secured to a support ring, which may be performed by gluing or welding for instance. At this point, the tufts may occupy their definite position in the assembly. The free ends, opposite the frame, may then be cut into the final shape.

While the first example process may be satisfactory in some embodiments, it may be deemed to bear inconveniences in other embodiments. In particular, such a first example process may have several sources of costs. First, the bristles may be made of a metal material which can be relative expensive. For instance, the bristles may be made of an alloy containing nickel, such as cobalt/nickel alloys such as Haynes 25, or nickel chromium alloys such as Hastelloy X, Hastelloy C-276 or Inconel 600, or perhaps stainless steel, which may be relatively expensive materials. In this context, the cutting of material at one or both ends may represent a source of waste associated to the cost that went into manufacturing the raw materials which are lost/not ultimately used in the seal assembly. Moreover, assembling the tufts, or arranging the tufts into the desired configuration, may be time consuming and a source of manufacturing variations which may represent another source of costs and be associated to a loss of or variability in quality. In some cases, there can be low raw material utilization, such as less than 30% of the wire length being present in the final part. The manual operations may require highly qualified work force and extended manual operations with a relatively low yield rate due to the manual operations inconsistencies.

Figure 4:
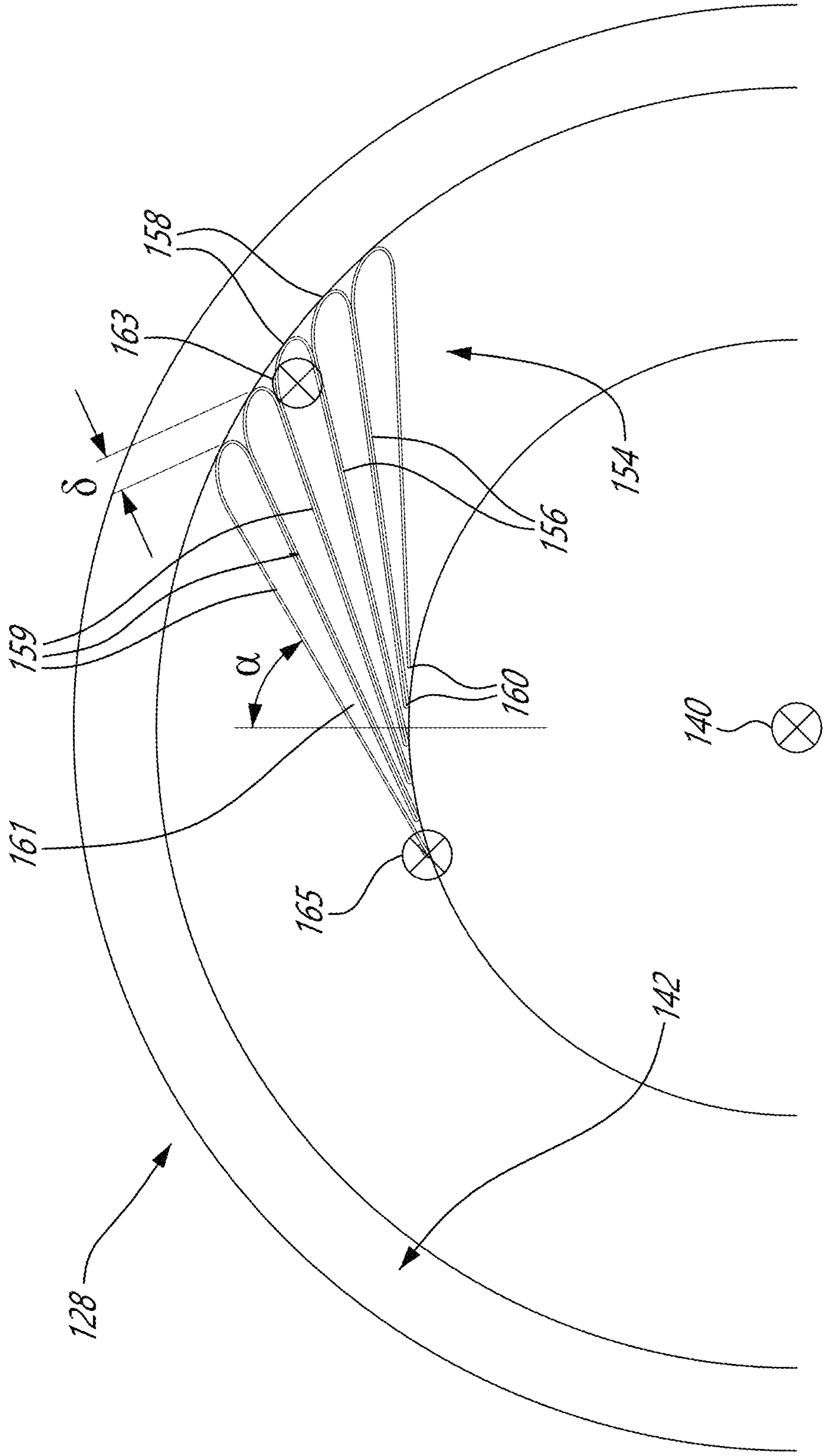
FIG. 4 is a cross-sectional view taken in a radial plane, showing a seal made of a flat metal material folded and arranged into a succession of lobes circumferentially distributed around a seal axis.

Another embodiment of a seal assembly 128 will be presented in relation with FIG. 4. More specifically, FIG. 4 presents a cross-sectional view taken in a radial plane relative the seal axis 140, where the seal assembly 128 may otherwise have an annular geometry similar to the embodiment shown in FIG. 2. More specifically, the seal assembly 128 has a support ring 142 extending annularly around the seal axis 140, and a seal 154 extending annularly around the seal axis 142, the seal 154 assembled to the support ring 142. In this embodiment, however, rather than having a seal consisting of a plurality of distinct bristles assembled to the support ring, the seal 154 has a succession of lobes 159 circumferentially distributed around the seal axis.

The succession of lobes are made of one or more strips 161 of a flat metal material. The succession of lobes can have a plurality of segments 156 extending between a number of alternating folds 158, 160, and is overall arranged in an annular configuration. The one or more strips 161 of the flat metal material can be elongated and flat. The one or more strips 161 can have two opposite faces, each facing a corresponding side of the strip. The one or more strips 161 can be folded regularly but alternatingly onto the first face, forming the first folds, or external folds 158, then onto the second face, forming the second folds, or internal folds 160, back onto the first face, then onto the second face, and so forth. A length of the one or more strips 161 can extend from one segment 156 to an adjacent segment 156 across a fold 160, 158. The external folds 158 can have an external fold bending radius defined around an external fold bending axis 163 which extends parallel to the seal axis 140. The internal folds 160 can have an internal fold bending radius defined around an internal fold bending axis 165 which also extends parallel to the seal axis 140. In one embodiment, a single strip 161 may be folded on alternating sides and extend around the entire circumference of the seal 154 and have a single discontinuity where two opposite ends of the single strip 161 meet. In another embodiment, a plurality of strips 161 may be joined in an end to end configuration (lengthwisely) and the succession of lobes 159 may have a corresponding plurality of discontinuities where longitudinal ends of adjacent ones of the plurality of strips 161 meet. During operation, rotation of a rotor engaging the internal folds during use may break the internal folds and form a plurality of discontinuities at the radially inner ends of the segments 156 where the internal folds formerly were. In one embodiment, the latter process may separate a formerly single strip into a plurality of strips where each one of the strips is associated to a corresponding lobe.

The succession of lobes 159 can be arranged generally in an annular shape as shown, with a width of the one or more strips 161 extending parallel to the seal axis 140. The external folds 158 may be circumferentially adjacent one another in the annular shape, and the internal folds 160 may also be circumferentially adjacent one another in the annular shape. The first folds may be at a radially-external region of the annular shape and the second folds may be at a radially-internal region of the annular shape. Straight segments 156 of the seal 154 can connect respective ones of the first folds to respective ones of the second folds. In the illustrated embodiments, the segments 156 can be straight and extend obliquely, both radially and tangentially, relative the axis of the annular shape (e.g. at an angle $\alpha$ relative to the radial orientation). A support ring 142 may receive the external folds 158 and extend concentrically around the seal 154. In one embodiment, the seal 154 is continuous around the entirety of the circumference of the annular shape, and two free ends of the strip 161 may meet adjacent one another at the support ring 142. In another embodiment, it may alternately be preferred to include more than one strip 161 to form the entire circumference.

As can be seen in the example presented in FIG. 4, the segments 156 of each pair of segments extending from a same external fold 158 are non-parallel, and slightly inclined towards one another, with a spacing distance between the segments 156 of each pair of segments reducing along a length of the segments 156, in a direction radially inward from the external fold 158. Indeed, the bending radius of the internal folds 160 is significantly smaller than the bending radius of the external folds 158. The internal folds 160 connect adjacent ones of the straight segments 156.

An embodiment of a seal assembly 128 such as shown in FIG. 4 may be produced with a process which will be explained in relation with the examples shown in FIGS. 5, 6A and 6B. Generally, the process may involve the following steps. First, a strip of flat metal material is formed in a width spanning the expected seal thickness. Then, the strip is folded and packed into an annular configuration, such as in a pack ready to weld. The pack may then be installed between a back plate and a front plate, centered, and assembled by welding. After welding, the seal assembly may go through a series of mechanical and thermal treatment operations, while being closer to a functional inner diameter than in the first example presented above. Accordingly, in one embodiment, trimming of the bristles may be avoided.

Figure 5:
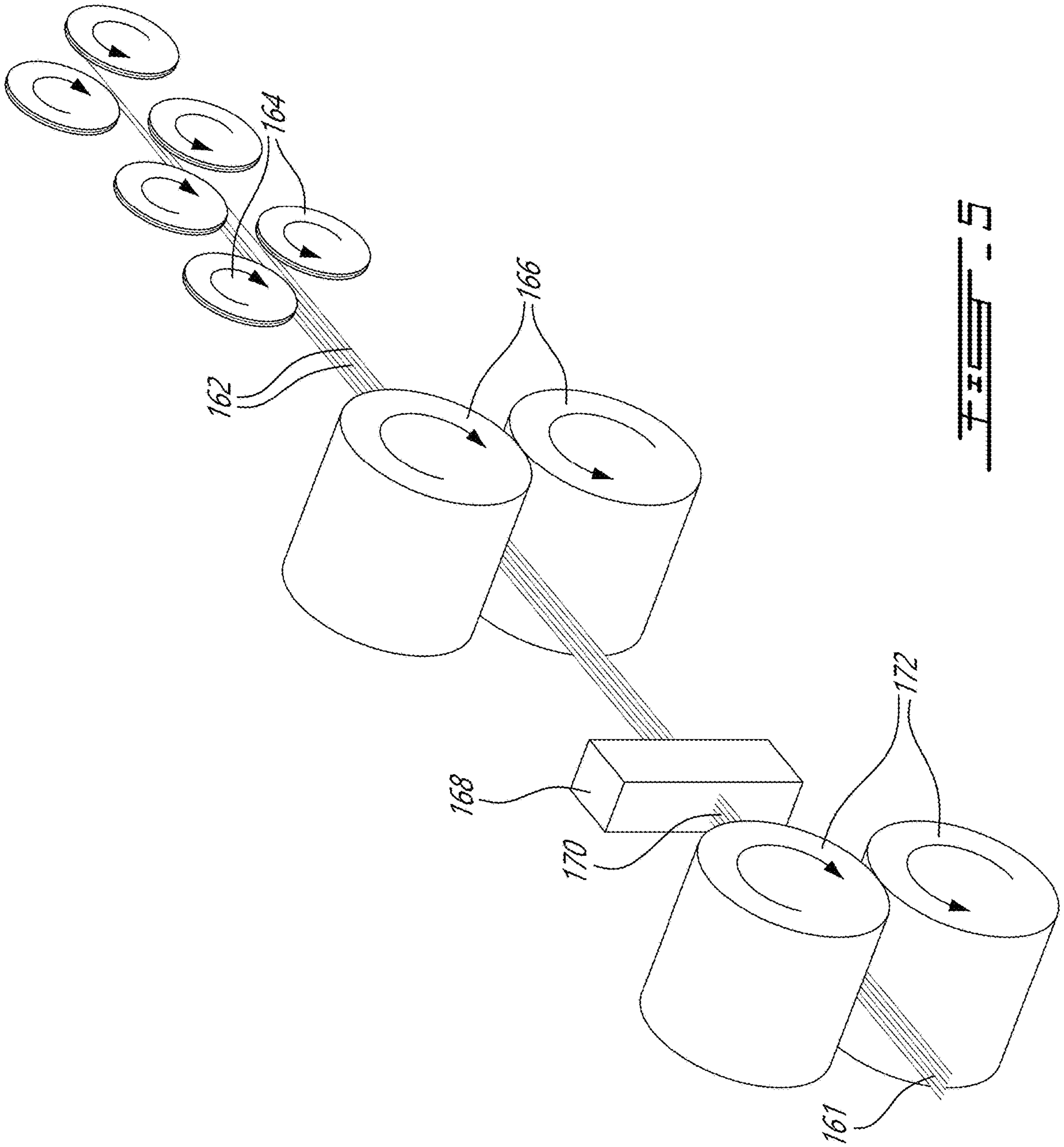
FIG. 5 is an oblique view of a process of forming a strip of metal material from a plurality of wires.

In the example embodiment presented in FIG. 5, the strip 161 is formed by arranging a plurality of wires 162 side by side in a single layer, over a given strip width. A holding media such as wax may be injected onto the wires to maintain the wires in the strip configuration. In the illustrated embodiment, the wires 162 are individually unwound from corresponding spools 164, and the spools 164 are arranged in alternating orientations, above and below the strip mid line, such that the remanent wire deformation of each wire cancels. The wires 162 can be arranged side-by-side to cover the specified width of the strip 161. The number of wires 162 in the width can be of between 8 and 20, such as between 12 and 14 for example. The wires 162 are pressed by opposed straightening rollers 166 (or more if desired) upstream of the wax injection nozzle 168. A composite strip of wires 170 distributed in the wax can be extruded from the hot wax injection nozzle 168. The resulting strip 161 may be referred to as being of a flat metal material independently of the presence of the wax or other holding media. The strip 161 can then be pressed by opposed laminating rollers 172 to set the dimension. In an alternate embodiment, the strip 161 may consist of a single flat, continuous strip of metal, e.g. a metal band, rather than of an assembly of wires 162.

Figure 6B:
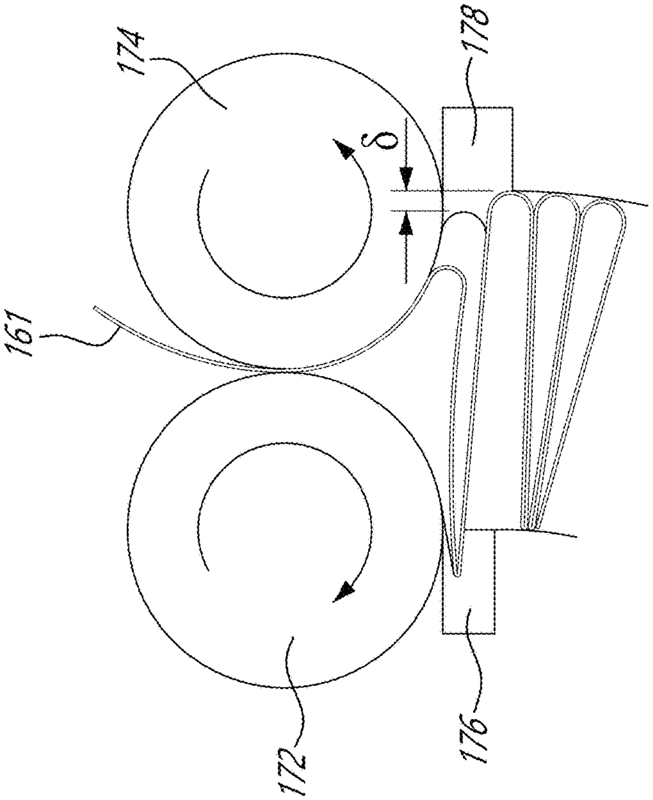
FIGS. 6A and 6B are cross sectional views taken at two steps of a sequence of folding a strip of metal material and arranging it circumferentially.
Figure 6A:
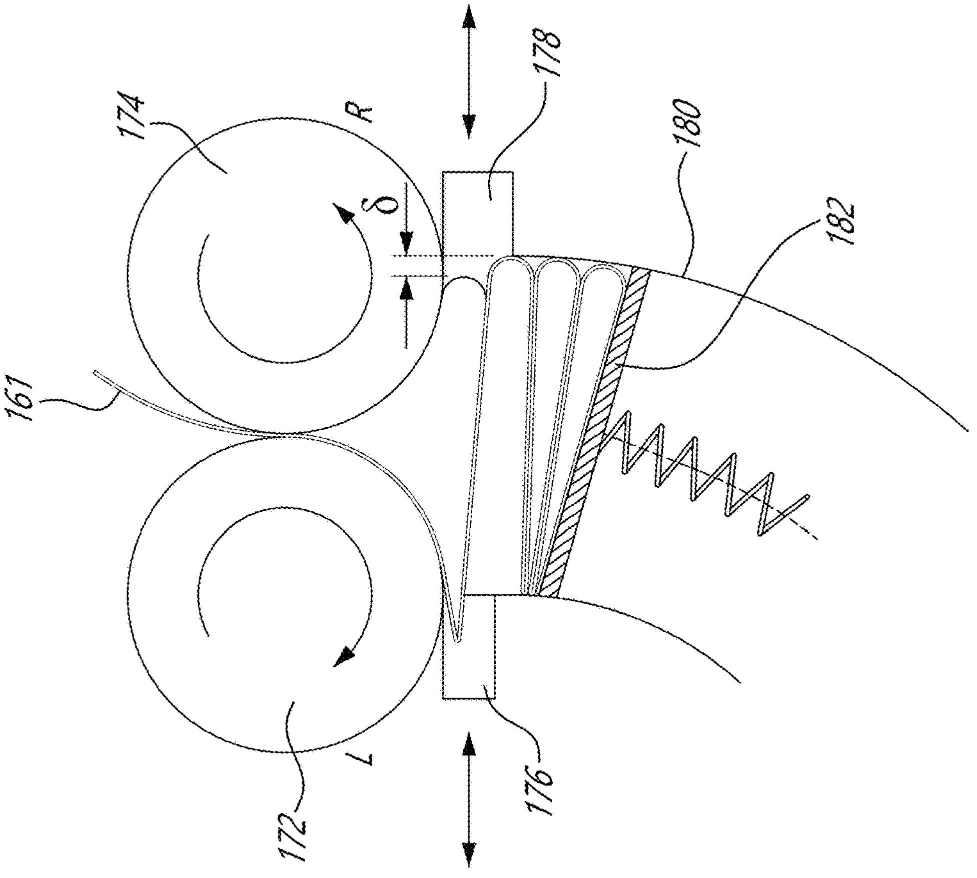

Referring now to FIGS. 6A and 6B, the strip 161 can be engaged into an automated folder or packaging machine. In this example, two rollers 172, 174 drive the strip 161. The strip 161 can be bias-bent to one side of the folder and follow one of the rollers 172. In this example, the strip 161 goes first to the left, until it meets the corresponding "hammer" 176 (or mould) which can be triggered by the mechanical action of the strip 161 and apply a rapid impact on the strip 161 thus both forming a precise bending radius and pushing the fold on the stack, thus liberating the hammer for the next cycle. The impact on the strip 161 may generate a wave in the strip 161 which may propagate and be fed by the incoming strip 161 to form the next fold on the right hand side. The right side hammer 178 may operate in a similar manner to left one. In the illustrated embodiment, the right side hammer 178 has a larger bending radius, and two "catching" grooves which are staggered by a depth y which plays a role in arranging the strip into an annular configuration such as an annular configuration where the straight segments 156 extend obliquely as exemplified above. The process may continue to alternate between the left side hammer 176 and the right side hammer 178 which may move laterally to accommodate the functionality. In the illustrated embodiment, the folded strip is received by a curved magazine 180 provided with a receiver plate 182 which can be spring loaded or motioned by an actuator for instance.

Once the folded strip package reaches the desired dimensions, it can be transferred from the magazine 180 to a holding device, where it can be welded to a holding element forming the support ring 142. Referring back to FIG. 3, the holding element can include two annular rails to which the folded strip package, and more specifically the folds, can be welded, which can leave a radially-external welding seam 50, as best seen in FIG. 3, and the folds trapped between a front wall 46 and a rear wall 48. In an embodiment where the strip 161 is formed of a plurality of wires held by a holding media such as wax, the holding media may be selected in a manner to melt away during welding, or a holding media removal operation may be used (e.g. solvent, oven heating, etc). In one example embodiment of forming a brush seal having an inner diameter of 7", 3300 double folds may be integrated to the manufacturing process, and a packaging machine may form 10 to 20 folds per seconds, producing one pack every 5 minutes or so.

Referring back to FIG. 4, the resulting bristle pack can have a particular geometry. The folding radius of the inner folds 160 may be close to zero, with the strip being bent far into the plastic domain. The folding radius of the outer folds 158 may be sufficiently large to account for the increased circumference, such as of the order of ⅓ of the wire diameter. The staggering between two consecutive large radius folding can be in the order of the wire diameter, and can be used to accommodate a desired angle $\alpha$. The finished seal assembly 128 may expose internal folds 160 on the inner functional diameter. In a context where the stiffness may be pronounced due to the presence of the two adjacent straight segments 156, the internal folds, forming internal tips, may wear fast at a first contact with the rotor, and free two loose ends to operate as a typical brush seal or, if the strip is made of a single band of metal rather than a plurality of wires, as a leaf seal. The pattern can be made very regular, which may combine better sealing performance with reduced wear. The repeatability of the bristle pack geometry may improve performance of a double brush seal by allowing uniform pressure load distribution between the two bristle packs.

Overall, depending on the details of implementation, the proposed method may offer repeatability, elimination of manual operation requiring qualified work, more raw material utilization, and uniform micro and macro geometry around the seal circumference.

Figure 7:
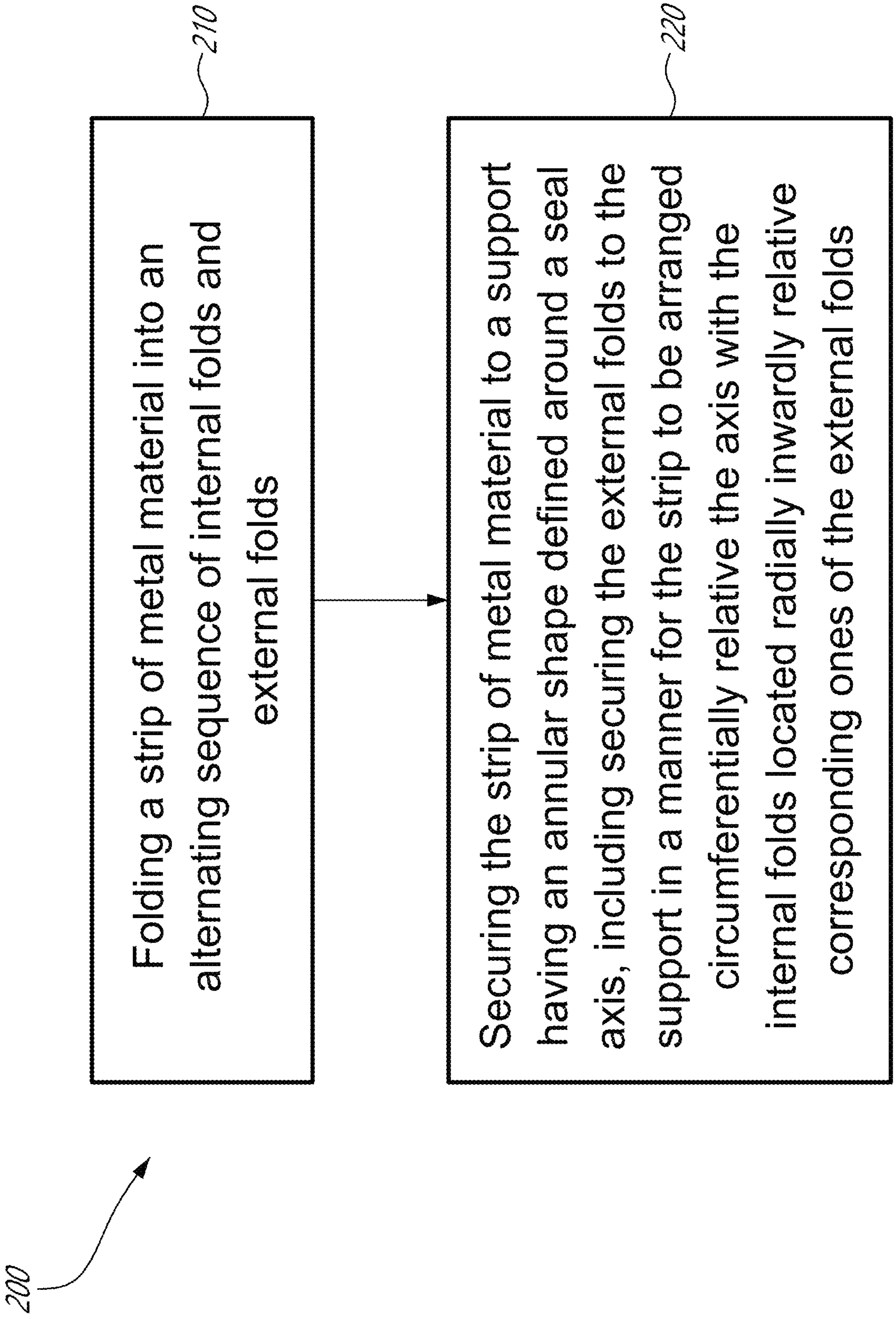
FIG. 7 is a flowchart of a process of making a seal assembly in accordance with one embodiment.

In summary, as presented in FIG. 7, a process 200 of making a seal assembly can include folding 210 a strip of metal material into an alternating sequence of internal folds and external folds, and securing 220 the strip of metal material to a support ring having an annular shape defined around a seal axis, including securing the external folds to the support ring in a manner for the strip to be arranged circumferentially relative the axis with the internal folds located radially inwardly relative corresponding ones of the external folds.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, a method similar to the one described in detail above may be used for "leaf" seals. The "leaf" seals are similar to brush seal except that instead of adjacent bristle across the thickness they use rectangular "leaves"-like thin metal sheet strips spanning the seal thickness, laid at an angle corresponding to the rotor direction of rotation and stacked around the circumference. Yet further modifications could be implemented by a person of ordinary skill in the art in view of the present disclosure, which modifications would be within the scope of the present technology.

The invention claimed is:

1. A process of making a seal assembly, the process comprising:

folding a strip of metal material into an alternating sequence of internal folds and external folds; and securing the strip of metal material to a support ring having an annular shape defined around a seal axis, including securing the external folds to the support ring in a manner for the strip to be arranged circumferentially relative the seal axis with the internal folds located radially inwardly relative the external folds;

wherein said folding includes feeding the strip into a spacing defined between an external fold hammer and an internal fold hammer in a manner for the feeding of the strip to alternatingly engage the internal fold hammer and the external fold hammer, the internal fold hammer forming the internal folds and the external fold hammer forming the external folds; and wherein said feeding includes a first roller and a second roller driving the strip into the spacing, the first roller being adjacent the external fold hammer, the second roller being adjacent the internal fold hammer;

wherein the engagement of the strip with the internal fold hammer is in the form of an impact forming a bending radius;

wherein the impact generates a wave in the strip, the wave propagating and forming a next fold against the external fold hammer.

2. The process of claim 1 further comprising forming the strip of metal material including assembling a plurality of wires adjacent one another into a strip arrangement, and applying a holding media to the strip arrangement to hold the plurality of wires in the strip arrangement.

3. The process of claim 2 further comprising removing the holding media during or subsequently to said securing.

4. The process of claim 1 wherein said securing includes welding the external folds to the support ring.

5. The process of claim 1 wherein said folding includes moving the external fold hammer and the internal fold hammer into and away from the spacing while feeding the strip.

6. The process of claim 1 wherein said folding includes accumulating a folded portion of the strip in a magazine having a curved shape corresponding to the annular shape of the support ring.

7. The process of claim 1 further comprising engaging a rotor within a circular opening concentric to the seal axis and delimited by the internal folds.

8. The process of claim 7 further comprising rotating the rotor relative the seal assembly, around the seal axis, thereby breaking the strip of metal material at the internal folds.

9. The process of claim 1 wherein the strip is bias-bent to one side and follows one of the rollers.

10. The process of claim 1 wherein the external fold hammer has two catching grooves staggered by a depth.

11. A process of making a seal assembly, the process comprising:

folding a strip of metal material into an alternating sequence of internal folds and external folds; and securing the strip of metal material to a support ring having an annular shape defined around a seal axis, including securing the external folds to the support ring in a manner for the strip to be arranged circumferentially relative the seal axis with the internal folds located radially inwardly relative the external folds;

wherein said folding includes feeding the strip into a spacing defined between an external fold hammer and an internal fold hammer in a manner for the feeding of the strip to alternatingly engage the internal fold hammer and the external fold hammer, the internal fold hammer forming the internal folds and the external fold hammer forming the external folds; and wherein said feeding includes a first roller and a second roller driving the strip into the spacing, the first roller being adjacent the external fold hammer, the second roller being adjacent the internal fold hammer;

wherein the external fold hammer has a larger bending radius than the internal fold hammer.

* * * * *